(12) United States Patent
Huber

(10) Patent No.: US 8,261,695 B2
(45) Date of Patent: Sep. 11, 2012

(54) BIRDBATH WITH INTEGRATED AUTOMATED MAINTENANCE

(76) Inventor: John Barton Huber, Mainville, OH (US)

( * ) Notice: Subject to any disclaimer, the term of this patent is extended or adjusted under 35 U.S.C. 154(b) by 0 days.

(21) Appl. No.: 13/011,454

(22) Filed: Jan. 21, 2011

(65) Prior Publication Data

US 2011/0174226 A1    Jul. 21, 2011

Related U.S. Application Data

(60) Provisional application No. 61/336,354, filed on Jan. 21, 2010.

(51) Int. Cl.
*A01K 45/00* (2006.01)
(52) U.S. Cl. ...................................................... 119/69.5
(58) Field of Classification Search .................. 119/69.5, 119/72–81
See application file for complete search history.

(56) References Cited

U.S. PATENT DOCUMENTS

| | | |
|---|---|---|
| 807,184 A | 12/1905 | Malnburg |
| 1,368,416 A | 2/1921 | Thomas |
| 1,962,840 A | 6/1934 | Rives |
| 1,959,886 A | 5/1935 | Wadsworth |
| 2,084,817 A | 6/1937 | Lombard |
| 2,309,772 A | 2/1943 | Karger |
| 2,792,257 A | 5/1957 | Davis |
| 2,878,781 A | 3/1959 | Wingfield |
| 2,930,531 A | 3/1960 | Kennedy, Jr. |
| 2,938,495 A | 5/1960 | Hinton |
| 3,228,613 A | 1/1966 | Goldstein |
| 3,488,068 A | 1/1970 | De Voe |
| 3,696,786 A | 10/1972 | Garwood |
| 3,844,516 A | 10/1974 | Klarke |
| 3,995,591 A | 12/1976 | Garwood |
| 4,058,259 A | 11/1977 | Schantz |
| 4,432,303 A | 2/1984 | Ellerstorfer |
| 4,519,544 A | 5/1985 | Szabo |
| D282,098 S | 1/1986 | Gural et al. |
| 4,630,569 A * | 12/1986 | Dieleman ................... 119/69.5 |
| 4,789,099 A | 12/1988 | Hager |
| 4,793,287 A | 12/1988 | Hofmann |
| 4,824,020 A | 4/1989 | Harward |
| 5,025,754 A | 6/1991 | Plyler |
| 5,205,521 A | 4/1993 | Smith |
| D344,217 S | 2/1994 | Weiss |

(Continued)

OTHER PUBLICATIONS

Paws Travels, "How to Keep Your Birdbaths and Fountains Clean", http://www.pawstravels.com/birdbath/howtokeepyourbirdbathsclean.html.

(Continued)

*Primary Examiner* — Monica Williams
*Assistant Examiner* — Michael A Fabula
(74) *Attorney, Agent, or Firm* — Thomas E. Lees, LLC

(57) ABSTRACT

A method for automatically maintaining a birdbath, a kit for automating maintenance of a birdbath, and a birdbath with integrated automated maintenance are provided. Maintenance of a birdbath includes placing a barrier in a birdbath bowl. Further, maintenance comprises performing a cleaning phase that streams water from a nozzle located remotely from the barrier such that water is sprayed into the bowl with sufficient force to cause water to swirl around the barrier, which cleans the bowl and discharges debris and contaminated water in the bowl when such debris and contaminated water crosses in line with the water stream. Still further, the maintenance comprises performing a filling phase after the cleaning phase, which streams water through the nozzle such that water is sprayed from the nozzle to fill the birdbath bowl with water.

14 Claims, 4 Drawing Sheets

U.S. PATENT DOCUMENTS

| | | | |
|---|---|---|---|
| D352,345 S | 11/1994 | Stieh | |
| 5,439,176 A | 8/1995 | Bussiere | |
| 5,605,010 A | 2/1997 | Furlong et al. | |
| 5,692,454 A | 12/1997 | Testa | |
| 5,743,212 A | 4/1998 | Forjohn | |
| 5,784,998 A | 7/1998 | Manzer | |
| 5,836,516 A | 11/1998 | Van Epps et al. | |
| 5,873,522 A | 2/1999 | Roberts | |
| 5,875,969 A | 3/1999 | Grundy | |
| 5,902,528 A | 5/1999 | Spragg | |
| 5,931,118 A | 8/1999 | Thompson | |
| 5,966,868 A | 10/1999 | Cox | |
| 6,079,951 A | 6/2000 | Morton | |
| 6,358,575 B1 | 3/2002 | Spragg | |
| 6,363,886 B1 | 4/2002 | Statton | |
| 6,484,666 B1 | 11/2002 | Reusche | |
| 6,568,610 B1 | 5/2003 | Ericksen | |
| D477,657 S | 7/2003 | Toyohara | |
| 6,634,316 B2 | 10/2003 | Desatoff | |
| 6,640,747 B2 | 11/2003 | Reusche | |
| 6,647,922 B1 | 11/2003 | Travis | |
| 6,684,813 B1 | 2/2004 | Lemon | |
| 6,708,443 B2 | 3/2004 | Hall | |
| 6,792,891 B1 | 9/2004 | Coburn et al. | |
| 6,799,533 B2 | 10/2004 | Flowers et al. | |
| 6,959,665 B2 | 11/2005 | Flowers et al. | |
| 6,981,469 B1 | 1/2006 | Welbourne | |
| 7,011,041 B1* | 3/2006 | Bradley | 119/69.5 |
| D527,792 S | 9/2006 | Hoernig | |
| 7,219,623 B2 | 5/2007 | Flowers et al. | |
| 7,380,517 B2 | 6/2008 | Flowers et al. | |
| 7,389,942 B2 | 6/2008 | Kenyon et al. | |
| 7,448,160 B2 | 11/2008 | Roberts | |
| 7,530,330 B1 | 5/2009 | Valle | |
| 7,708,210 B2 | 5/2010 | Griffen | |
| 2003/0075113 A1 | 4/2003 | Desatoff | |
| 2003/0101942 A1 | 6/2003 | Reusche | |
| 2003/0127542 A1 | 7/2003 | Cooper | |
| 2003/0213437 A1 | 11/2003 | Norris | |
| 2004/0134439 A1 | 7/2004 | Flowers et al. | |
| 2004/0149230 A1 | 8/2004 | Reusche et al. | |
| 2005/0056227 A1 | 3/2005 | Flowers et al. | |
| 2005/0145184 A1 | 7/2005 | Fort, II | |
| 2005/0229861 A1 | 10/2005 | Reusche et al. | |
| 2006/0037545 A1* | 2/2006 | Bradley | 119/69.5 |
| 2006/0037547 A1 | 2/2006 | Flowers et al. | |
| 2006/0091244 A1 | 5/2006 | Guo | |
| 2006/0163374 A1 | 7/2006 | Wooten | |
| 2006/0169213 A1* | 8/2006 | Montie et al. | 119/69.5 |
| 2006/0196437 A1 | 9/2006 | Nalven et al. | |
| 2006/0255177 A1 | 11/2006 | Heatwole et al. | |
| 2007/0028846 A1 | 2/2007 | Cohen | |
| 2007/0045449 A1 | 3/2007 | Herring et al. | |
| 2007/0051829 A1 | 3/2007 | Griffin | |
| 2007/0056519 A1 | 3/2007 | Palmer | |
| 2007/0176023 A1 | 8/2007 | Herring et al. | |
| 2007/0205304 A1 | 9/2007 | Griffin | |
| 2007/0209600 A1 | 9/2007 | Flowers et al. | |
| 2008/0041321 A1 | 2/2008 | Jong et al. | |
| 2008/0047497 A1 | 2/2008 | Reusche et al. | |
| 2008/0083839 A1 | 4/2008 | Altaii | |
| 2008/0173245 A1 | 7/2008 | Reusche et al. | |
| 2009/0159261 A1 | 6/2009 | Lira et al. | |
| 2009/0230206 A1 | 9/2009 | Nies et al. | |
| 2009/0277392 A1 | 11/2009 | Potter | |
| 2009/0288607 A1 | 11/2009 | Held et al. | |
| 2010/0006669 A1 | 1/2010 | Thompson | |
| 2010/0089332 A1* | 4/2010 | Dye et al. | 119/69.5 |
| 2010/0140377 A1 | 6/2010 | Penar | |

OTHER PUBLICATIONS

"Instructions for the Feather-Mister", http://www.healingrainbows.com/f/feathermister.pdf.

Feather Mister Product Ratings and Cheapest Prices, http://www.juggle.com/feather-mister.

Bradley, Mike, "Self Cleaning Bird Bath.com Inc., Cleanest Water a Bird Can Get—The Self Cleaning Bird Bath Story", http://selfcleaningbirdbath.com/store/index.php?main_page=page_2.

Clark, James, "The Automatic Bird Bath", http://jamesmclark5.home.comcast.net/~jamesmclark5/Birdwatching/Bird_Bath.htm, Jun. 22, 2005.

Clark, James, "The Automatic Bird Bath—JC Blogs", http://jamesmclark.blogspot.com/2005/06/automatic-birdbath.html, Jun. 22, 2005.

"Wildlife Management Plans—HeavenlyViews", http://heavenlyviews.net/3.html.

Signature Hardware, "Economy Exposed Outdoor Shower Unit", http://www.signaturehardware.com/product1338?origin=product-search.

Bradley, Mike, "Self Cleaning Bird Bath.com Inc., Cleanest Water a Bird Can Get—Video of Self Cleaning Birdbath", http://selfcleaningbirdbath.com/store/index.php?main_page=page_3.

Bradley, Mike, "Self Cleaning Bird Bath.com Inc., Cleanest Water a Bird Can Get—Installation of Birdbath", http://selfcleaningbirdbath.com/store/index.php?main_page=page_4.

* cited by examiner

BIRDBATH WITH INTEGRATED AUTOMATED MAINTENANCE

CROSS-REFERENCE TO RELATED APPLICATIONS

This application claims priority to U.S. provisional patent application No. 61/336,354 filed Jan. 21, 2010 entitled THE BIRD BATH WATER EXCHANGE, the disclosure of which is incorporated herein by reference.

BACKGROUND

Various aspects of the present invention relate generally to birdbaths and more specifically to the maintenance of birdbaths, e.g., to provide for the automatic cleaning and restoration of clean water within a birdbath bowl.

Many birdbaths include a shallow bowl that is usually perched on a pedestal. The inside of the bowl defines a hollow space that can be filled with water, either by a natural means such as rain, or by artificial means such as a person filling the bowl using water from a conventional garden hose. When the birdbath bowl is full of water, birds may enjoy the birdbath for bathing or as a source of drinking water.

However, the water in a birdbath will likely become contaminated over time. For instance, water in a birdbath bowl may become dirty over time due to birds washing themselves in the water or through bird excrement left in the water. Also, over time, scum, algae and other build-up may contaminate the water. Still further, the birdbath bowl may become dirty due to leaves, twigs, pinecones, dirt and other debris that have fallen into the birdbath bowl.

BRIEF SUMMARY

According to aspects of the present invention, a method for providing maintenance of a birdbath is disclosed. The method includes placing a barrier in a bowl of the birdbath. After the barrier is placed in the birdbath, an automated cleaning operation is performed having at least two phases: a cleaning phase and a filling phase. The cleaning phase streams water through a water discharge device at a first pressure such that water is sprayed from a nozzle positioned remotely from the barrier, into the bowl of the birdbath, with sufficient force to cause water to swirl around the barrier. The swirling water cleans the bowl. Moreover, the force of the stream is sufficient to cause debris and contaminated water in the bowl to be discharged when such debris and contaminated water cross in line with the water stream. The cleaning phase is performed for a pre-determined cleaning time. The filling phase, performed after the cleaning phase, streams water through the water discharge device at a second pressure, which is lower than the first pressure, such that water is sprayed from the nozzle to fill the birdbath bowl with water. The filling phase lasts for a pre-determined fill time.

According to further aspects of the present invention, a birdbath maintenance kit is disclosed. The kit includes a barrier and a water discharge device. The size of the barrier is based at least in part on a diameter of the bowl of a birdbath to which the maintenance kit is applied. The water discharge device has a base to secure the water discharge device to the ground, a substantially vertical, hollow mast extending from the base and a discharge nozzle operatively coupled to the mast. When the kit is assembled, the base secures the water discharge device to the ground proximate to the birdbath and the mast is coupled to receive water through the mast. Moreover, the nozzle is positioned remotely from the barrier and is directed towards the birdbath bowl.

The nozzle is operative during a cleaning phase to stream water at a first pressure such that water is sprayed into the bowl of the birdbath with sufficient force to cause water to swirl around the barrier. In this regard, the swirling water cleans the bowl. Moreover, the force of the stream is sufficient to cause debris and contaminated water in the bowl to be discharged when such debris and contaminated water cross in line with the water stream. The cleaning phase operates for a pre-determined cleaning time. Additionally, the nozzle is operative during a filling phase to stream water at a second pressure, which is lower than the first pressure, such that water is sprayed from the nozzle to fill the birdbath bowl with water for a pre-determined fill time.

According to still further aspects of the present invention, a birdbath is disclosed. The birdbath comprises a base including an input to receive water and a conduit operatively coupled to receive water through the input. The birdbath also includes a bowl coupled to the base. A barrier is positioned in the bowl. A first nozzle is mounted on the circumference of the bowl and is operatively coupled to the conduit to receive water and provide a first stream. The first nozzle is operative during a cleaning phase to stream water at a first pressure such that water is sprayed into the bowl of the birdbath with sufficient force to cause water to swirl around the barrier. The swirling water cleans the bowl. Moreover, the force of the stream is sufficient to cause debris and contaminated water in the bowl to be discharged when such debris and contaminated water cross in line with the water stream from the first nozzle. The cleaning phase is operated for a pre-determined cleaning time. Moreover, the first nozzle is operative during a filling phase to stream water at a second pressure, which is lower than the first pressure, such that water is sprayed from the nozzle to fill the birdbath bowl with water for a pre-determined fill time.

BRIEF DESCRIPTION OF THE SEVERAL VIEWS OF THE DRAWINGS

The following detailed description, which describes various embodiments and other aspects of the present invention, can be best understood when read in conjunction with the following drawings, where like elements are indicated with like reference numerals, and in which.

For simplicity and clarity of illustration, elements shown in the figures have not necessarily been drawn to scale. For example, the dimensions of some of the elements may be exaggerated relative to other elements for clarity of discussion.

DETAILED DESCRIPTION

Various aspects of the present invention facilitate maintaining a birdbath through the automatic cleaning of the birdbath bowl, and through the automatic restoration of clean water within the bowl of the birdbath. For instance, maintenance generally comprises operations that scour the surface of the birdbath bowl, operations that flush debris and contaminated water out of the birdbath bowl and through operations that replenish the bowl with new water. Accordingly, a bowl of a birdbath may be automatically cleaned and refilled at prescribed times, as will be described in greater detail herein.

Figure 1:
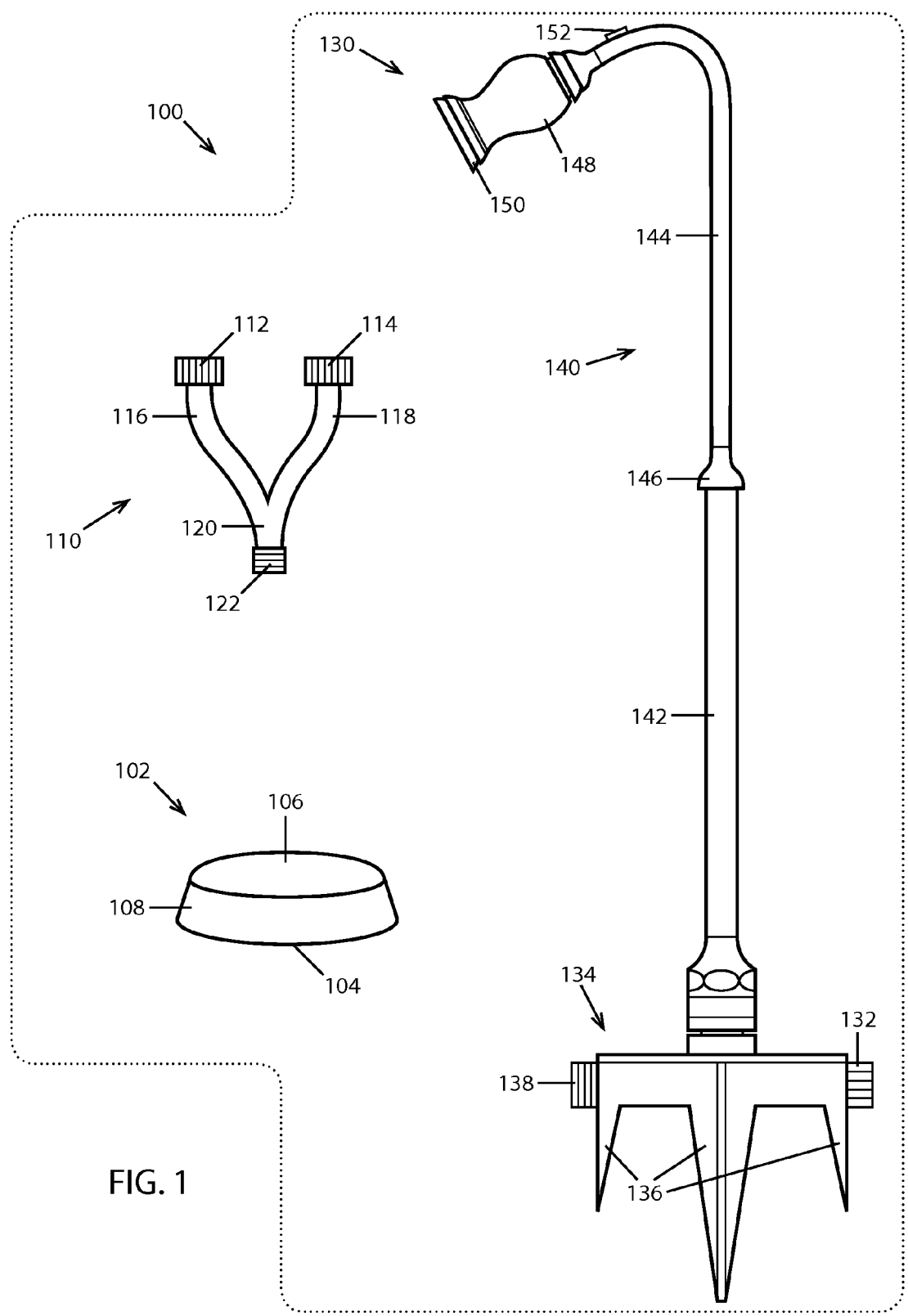
FIG. 1 illustrates exemplary components that make up a birdbath maintenance kit for installation in cooperation with a birdbath, according to various aspects of the present invention.

Referring now to the drawings, and in particular, to FIG. 1, exemplary components of a birdbath maintenance kit 100 are illustrated, according to various aspects of the present invention. The birdbath maintenance kit 100 may be used in cooperation with an existing birdbath, e.g., to perform operations such as automatic cleaning and filling of the birdbath bowl.

The kit 100 includes a barrier 102 that is placed into a bowl of a birdbath that a user wishes to maintain. By way of example, the illustrated barrier 102 includes a bottom portion 104, a top portion 106, and a side portion 108 that form a conical frustum. During cleaning operations, water is sprayed into the birdbath bowl, causing the water to swirl around the barrier 102. The combination of spraying and swirling water scours the bowl 262 and cleans and/or flushes debris, contaminated water, dirty water, etc., from the bowl, as will be described in greater detail herein. In an exemplary implementation, the bottom portion 104 of the barrier 102 is ten inches, approximately 25.4 centimeters (cm), in diameter and the top portion 106 is eight-and-a-half inches (approximately 21.6 cm) in diameter. As such, the exemplary barrier 102 is circular when looking top-down. Further, the height of the barrier 102 may be approximately equal to, or otherwise correspond with, the depth of the bowl in which the barrier 102 is placed. Keeping with the above-example, the side portion 108 of the exemplary barrier 102 may be approximately one-and-three-quarters inches (approximately 4.4 cm) spanning between the top portion 106 and the bottom portion 108.

In general, the size and overall shape of the barrier 102 may depend, for example, upon the size and depth of the bowl of the associated birdbath. For instance, the diameter of the barrier 102 may be proportional to the diameter of a bowl of a birdbath in which the barrier 102 is placed. Moreover, the barrier 102 may comprise other shapes or configurations and the height of the barrier 102 need not match the depth of the birdbath bowl. In an illustrative example, the barrier 102 is as deep or deeper than the anticipated water level in a corresponding birdbath bowl.

The barrier 102 may be constructed from any suitable material. For instance, the barrier 102 may be concrete, or other material that will remain stationary or otherwise not slide around after being placed in the bowl, after being exposed to standing water, or even in response to spraying water by other components of the kit 100. According to further aspects of the present invention, as an alternative to providing the barrier 102, the kit 100 may include a means for allowing the user to create the barrier 102, such as by providing a mold shaped like the desired barrier 102 or a ring that allows a user to create the barrier out of cement or other desired material. The use of the barrier 102 is discussed in greater detail in reference to the figures below.

In an exemplary implementation, a mold may be provided to a user, such as a pressed cardboard mold, which is open at both top and bottom. The user securely applies tape all along the outer perimeter of the form attaching the mold to the center of an existing bird bath bowl. A mix of concrete patch or other suitable material is then poured into the mold and is leveled at the top. After the barrier has set up, the mold can be removed. For instance, a cardboard mold can be dampened and easily removed.

The kit 100 may further include an optional common connector 110. As will be described in greater detail herein, the common connector 110 is utilized to direct water from a dual zone timer or other suitable water control device (optionally provided with the kit 100), to a common water line (also optionally provided with the kit 100) that directs water to the vicinity of the user's birdbath. An exemplary water control device and an exemplary common water line are described with reference to FIGS. 2A and 2B.

The common connector 110 includes a first input 112 and a second input 114. The common connector 110 directs water from the first input 112 down a first conduit 116. Correspondingly, the common connector 110 directs water from the second input 114 down a second conduit 118. The first conduit 116 and the second conduit combine at a conduit 120 and the water is directed out the output 122. As depicted, the first input 112 and second input 114 have female connectors, such as conventional female garden hose connectors. However, the first input 112 and second input 114 may alternatively have male connectors. Further, the connector of the first input 112 is not required to be the same type as the connector of the second input 114. Likewise, the connector on the output 122 may be either male or female. The use of the common connector is discussed in greater detail below with reference to FIGS. 2A and 2B.

Still further, the kit 100 includes a water discharge device 130. The water discharge device 130 includes an input 132 attached to a base 134. For instance, the input 132 may connect to a conventional garden hose or other device implementing the common water line (see FIG. 2A) between the common connector 110 and the water discharge device 130. As illustrated, the base 134 further includes spikes 136 to secure the water discharge device 130 into the ground. The base 134 also optionally includes an output 138. The output 138 may be used to connect another water discharge device (not shown) serially with the instant water discharge device 130. The other water discharge device may be used to clean another existing birdbath. Alternatively, the output 138 may be capped, as to prevent water from flowing out of the output 138. The input 132 and output 138 may each be implemented as any suitable connector, e.g., a male garden hose connector or a female garden hose connector.

The base 134 directs incoming water from the input 132 to a hollow mast 140. The illustrated mast 140 includes a lower portion 142 and an upper portion 144. However, the mast 140 may be implemented using single portion, or more than two portions, as will be described in greater detail herein. The lower portion 142 may be constructed of any material, including those used in common plumbing practices such as, but not limited to, copper, polyvinyl chloride (PVC), etc.

The upper portion 144 may likewise be constructed of any material, including those used in common plumbing practices such as, but not limited to, copper, polyvinyl chloride (PVC), etc. However, as illustrated, the top of the upper portion 144 is bent at an angle to redirect a flow of water towards a birdbath as will be described in greater detail herein. According to aspects of the invention, the upper portion 144 may be made of a bendable material, such as copper that is bent to the desired shape. Alternatively, the upper portion 144 may be made from a flexible material. Thus, according to aspects of the invention, the user may adjust the angle of the flexible upper portion 144. Still further, the upper portion 144 may be constructed of a material that can be formed or otherwise molded into the desired shape. In this regard, the upper portion may be rigid.

In the illustrative implementation, a reducer element 146 is positioned between the lower portion 142 and the upper portion 144. The reducer element 146 allows the lower portion 142 to have a larger diameter than the upper portion 144.

According to further aspects of the present invention, the mast 140 may be telescopic. In such a telescopic mast 140, there may be more than two portions 142, 144. A telescopic mast 140 may be used, for example, to accommodate very short bird bath structures, and as well to facilitate hillside installations where the mast 140 and a corresponding birdbath are not resting at the same elevation.

As an illustrative example, the reducer element 146 may optionally be an adjustment ring such that when twisted in one direction it tightens around the mast 140, while twisting in the other direction causes it to loosen. With such an option, when the reducer element 146 is loosened, the upper portion 144 of the mast 140 may be raised and lowered relative the lower portion 142. When the reducer element 146 is tightened, the upper portion 144 stays at the adjusted height. In such a manner, the mast 140 uses the reducer to facilitate a telescopic function.

The mast 140 directs incoming water to a nozzle 148. As an example, the nozzle 148 may be a tapered cylindrical nozzle which can support decorative features for aesthetic purposes. For instance, the nozzle 148 may be surrounded by a bell-shaped skirt, which imitates the form of a flower.

As illustrated, the nozzle 148 includes a stream adjuster 150. The nozzle 148 discharges water out holes (not shown) in the end of the nozzle 148. The stream adjuster 150 allows the user to adjust the concentration of the water leaving the nozzle 148. When turned in one direction, the stream adjuster 150 concentrates the water leaving the nozzle 148, while turning the stream adjuster in the other direction causes the water to disperse.

If the stream adjuster 150 on the nozzle 148 does not regulate the water leaving the nozzle 148 to the user's liking, then the user may adjust a flow control valve 152 on the upper portion 144 of the mast 140. Still further, the nozzle 148 may include an optional pivoting connector to the upper mast 144, thus permitting the nozzle 148 to be adjusted in its aim toward an associated birdbath bowl. The flow of water and the nozzle 148 are discussed in greater detail below in reference to FIGS. 2A and 2B.

Thus, the illustrated birdbath maintenance kit 100 includes three distinct elements: the barrier 102, the common connector 110, and the water discharge device 130. The water discharge device 130 includes three elements: the base 134, the mast 140, and the nozzle 148.

In this illustrative implementation, the user supplies a birdbath and the garden hose(s) or other conduit for delivering the water supply to the water discharge device 130. The user may choose to install a layer of decorative stone or precast concrete squares beneath the birdbath in order to avoid erosion etc. due to repeated maintenance operations.

Moreover, according to aspects of the present invention, the kit 100 may include an optional timer, as described more fully herein. However, a timer may not be required, such as where a user already has a timer with two free outlets, e.g., as part of a multi-point irrigation system, etc.

Figure 2A:
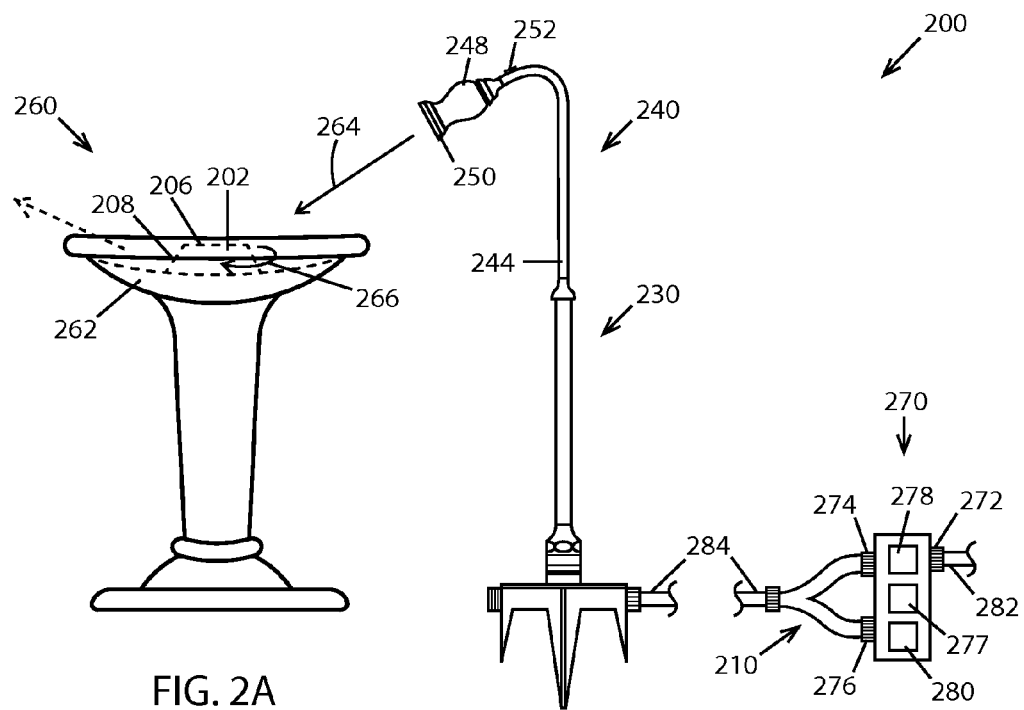
FIG. 2A is a schematic view of an embodiment of the birdbath maintenance kit of FIG. 1, installed in cooperation with a birdbath and an automatic timer, where the birdbath maintenance kit operates periodically to provide for the automatic cleaning of the bowl and for the restoration of clean water to a bowl of the birdbath, according to various aspects of the invention.
Figure 2B:
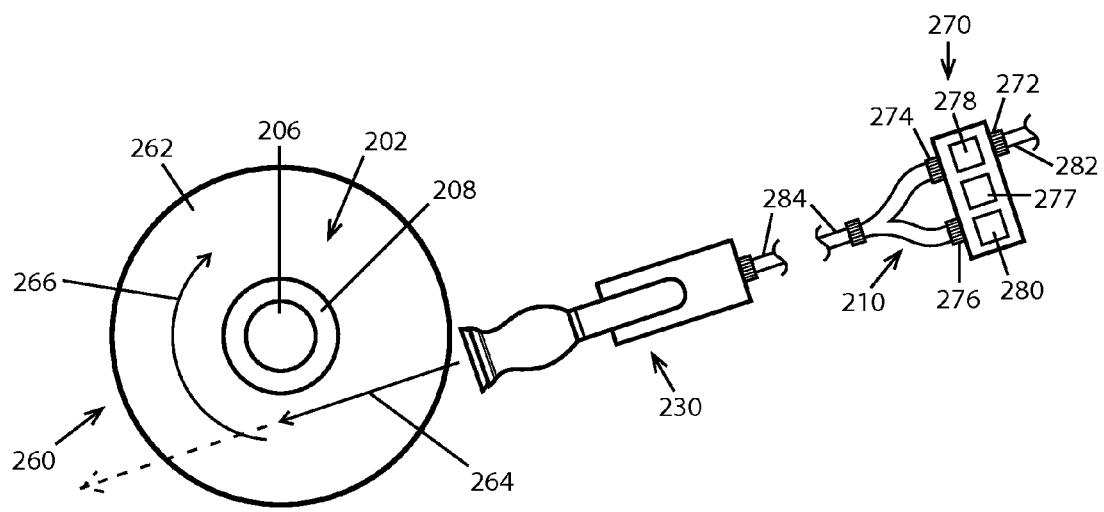
FIG. 2B is a schematic view of the embodiment of the birdbath maintenance kit of FIG. 2A, illustrated looking down at the top of the birdbath, according to various aspects of the invention.

Referring to FIG. 2A and FIG. 2B generally, a birdbath maintenance kit 200 is schematically illustrated in cooperation with a birdbath 260 which includes a bowl 262. FIG. 2A illustrates the birdbath 260 in a side view, whereas FIG. 2B illustrates the birdbath 260 from a top view. Unless specifically indicated herein, elements of the birdbath maintenance kit 200 are analogous to like elements of the birdbath maintenance kit 100, which have a reference number 100 lower in FIG. 1.

In FIGS. 2A and 2B, the user has placed the barrier 202 in a concave, hollow space of the bowl 262. That hollow space within the bowl typically holds water for birds to use. The barrier 202 may be placed in the bowl 262 such that the barrier 202 is able to be removed, or the barrier 202 may be permanently attached to the bowl 262 as described in greater detail above. If the barrier 202 is not permanently attached to the bowl, 262, then the barrier 202 should not be buoyant. Moreover, the barrier 202 should not slide along the bowl 262 in response to water sprayed from the water discharge device 230. Although the barrier 202 may be placed anywhere in the bowl 262, the placement for the barrier 202 in the illustrative example of FIG. 2A is about the center of the hollow space of the bowl 262. Most conventional birdbath bowls are generally circular when looking top-down. As such, the barrier 202 should be generally centered within the birdbath bowl.

In an irregularly shaped bowl 262, the barrier 202 may not necessarily be positioned at the bowl center. For example, in a clamshell shaped bowl 262, the barrier 202 may be offset, e.g., positioned off to one side closer to the deeper end of the shell-shaped bowl. As an illustrative example, the barrier 202 may be centered about a vertical axis passing through a center of mass of the water in the bowl 262, such that there is approximately an equal volume of water all around the barrier 202.

The water discharge device 230 is mounted to the ground by positioning the water discharge device proximate to the birdbath and by driving the stakes of the base into the ground. Because the nozzle 248 is part of the water discharge device 230, the nozzle is positioned remotely from the barrier 202. Moreover, the nozzle 248 is stationary after initial setup, and may be directed towards the birdbath bowl, as will be described in greater detail herein.

The distance that the water discharge device 230 should be placed from the birdbath 260 depends on the pressure of a water source. For example, in places operating from typical public water systems, such as where the water pressure is fifty-five pounds per square inch or greater, then the water discharge device 230 can be placed approximately twenty-one inches (approximately 53.3 cm) from the nearest edge of the bowl 262 of the birdbath 260. In places with a lower water pressure, such as places operating from private wells, then the water discharge device 230 may be placed relatively closer to the birdbath bowl 262. For instance, the water discharge device 230 may be placed approximately nineteen inches (approximately 48.3 cm) from the nearest edge of the bowl 262 of the birdbath 260.

During a cleaning phase, water comes up through the hollow of the mast such that the water discharge device 230 sprays water in a stream 264 pointed toward the bowl 262 of the birdbath 260. The water is sprayed at a first pressure suitable for performing the cleaning operation, e.g., such that water is sprayed into the bowl of the birdbath with sufficient force to cause water to swirl around the barrier 202, wherein the swirling water cleans the bowl and debris and contaminated water in the bowl are discharged when such debris and contaminated water cross in line with the water stream, as described more fully herein.

As an example, water may be sprayed at a full pressure. In this regard, the user may be required to moderate the "full pressure," such as by controlling the pressure at the house bibcock, at the flow control valve 252, etc., to achieve the desired results from the cleaning cycle as described more fully herein.

Further, the general direction of the stream 264 should be angled into the bowl 262 such that the stream 264 hits the bowl 262 and extends generally alongside the barrier 202. The stream should simultaneously discharge at least some of the water in the bowl 262 while swirling the rest of the water around the barrier 202 as illustrated by the dashed arrows. The swirling water circulates and draws dirt and other contamination from the center of the bowl 262. The contamination is thus removed from the birdbath bowl 262 by the combination of the swirling water and the spraying stream of water directed into the bowl. In this regard, the cleaning operation may substantially empty the bowl of water over the duration of the cleaning phase.

For instance, the swirling water creates a tendency that large objects are flung to the outside edges of the swirling water as a result of centrifugal force during the cleaning phase. Thus, leaves and other large debris migrate to the outside edges of the bowl 262. Moreover, the barrier 202 removes the negative pressure zone in the center of the swirling water. As such, even small dirt and other specks that might otherwise tend toward the center of the bowl 262 due to the swirling water are discharged because the barrier 202 prevents such migration, thus allowing the stream to discharge even small contamination. Still further, swirling water may create sufficient force so as to provide a mechanical scouring action that cleans the surface of the bowl 262. For example, certain birdbath bowls 262 require the scouring action to last for forty-five seconds up to a full minute to be fully cleaned.

The required water pressure during the cleaning cycle typically need be no higher than that of standard domestic water supplies. There may be no need to augment the available water pressure. Rather, the user may be required to moderate the pressure in order to reduce the flow to that which will perpetuate the swirling motion without too quickly jettisoning all of the water from the bowl 262.

As noted above, the barrier 202 helps facilitate the cleaning phase by removing dead spots, such as a dead spot which may otherwise occur in the center of the swirling water. As described above with reference to FIG. 1, the diameter of the barrier 202 may be proportional to the diameter of the bowl 262. For instance, in an illustrative implementation, the diameter of the barrier 202 is approximately one-third of the diameter of the bowl 262. However, regardless of the particular size or shape, the barrier 202 is utilized to enhance the efficiency of the centrifugal force during the cleaning phase and eliminates the retention of small particle contaminants by removing the dead pressure zone in the middle of the swirling water.

Depending upon the spray pattern, some water sprayed from the nozzle 248 during a cleaning phase may hit the barrier 202, or splash against the barrier 202, which is acceptable so long as the water begins to swirl in the bowl 262 with sufficient capacity to perform the desired cleaning function.

As described above, the water discharge device 230 is positioned and aimed towards a corresponding birdbath 260 so as to provide a rigorous rotation of the water within the bowl 262 so as to facilitate cleaning and discharge functions during a cleaning phase. This swirling water may be in a clockwise or counterclockwise direction based on the side of the bowl 262 hit by the stream 264 relative to the placement of the water discharge device 230.

While the water may swirl in either direction during a cleaning phase, an illustrative exemplary approach is to direct the stream 264 to cause water in the bowl 262 to swirl in a counterclockwise direction for places with relatively higher water pressure, such as locations with publically operated water systems. By way of illustration, the upper mast of the water discharge device 230 may be aimed so as to cause the full pressure stream of the cleaning phase to impact within the bowl 262 at approximately the three o'clock position on the face of the bowl 262, generally between the right edge of the bowl 262 and the outer edge of the barrier 202. This creates a counterclockwise rotation within the bowl 262 and prolongs the cleaning/discharge function before a complete emptying of the water in the bowl 262 occurs, thus increasing the strength of the cleaning/discharge cycle.

A further illustrative exemplary approach is to direct the stream 264 to cause water in the bowl 262 to swirl in a clockwise direction for places with relatively lower water pressure, such as locations with private well systems. By way of illustration, the upper mast of the water discharge device 230 may be aimed so as to cause the full pressure stream of the cleaning phase to impact within the bowl 262 at approximately the nine o'clock position on the face of the bowl 262, generally between the left edge of the bowl 262 and the outer edge of the barrier 202. This creates a clockwise rotation within the bowl 262 and prolongs the cleaning/discharge function before a complete emptying of the water in the bowl 262 occurs, thus increasing the strength of the cleaning/discharge cycle.

The exemplary implementations above may be suitable for birdbaths located in the northern hemisphere. These illustrative directions of circulating water with respect to water pressure may be reversed for locations in the southern hemisphere of the Earth.

In FIGS. 2A and 2B, the water swirls in the clockwise direction for purposes of illustration only. The swirling water 266 moves debris and contaminated water around the bowl 262 in a rigorous rotation. Water swirls around the bowl 262, and the debris and contaminated water are discharged from the bowl 262 when the debris and contaminated water cross in line with the water stream 264 in FIG. 2B.

According to aspects of the present invention, the size and/or shape of the barrier 202 should be sufficient to aid in facilitating a cleaning operation, such as by enhancing the cleansing efficiency of the swirling water by eliminating the retention of very small contaminates in the center of the bowl 262. For instance, the barrier 202 may eliminate the vortical retention of very small contaminants that would otherwise migrate to the center of the bowl were it not for the barrier 202. The swirling water may further promote a scrubbing action that can further clean the bowl 262. Still further, the barrier 202 eliminates the retention of contaminants by removing a dead pressure zone in the center of the swirling water.

The broad range of birdbath bowl sizes, shapes, and water depths demand flexibility for adjusting the force of the water, the shape of the water stream, and the angle at which the water impacts with the bowl. In this regard, the user may adjust the stream 264 in up to five or more different ways to achieve the desired cleaning results.

For instance, a user may adjust the flow of the stream using a stream adjuster 250 on the nozzle 248. For instance, in an illustrative implementation, adjustments, if needed, may be implemented by increasing the concentration of the water stream and the speed of the swirling water by making small clockwise movements at the nozzle head. Alternatively, adjustments may be made by decreasing the concentration of the water stream and the speed of the swirling water by making small counterclockwise movements in order to soften the force of the water's impact on the bowl surface. Such counterclockwise adjustments to the nozzle head will slow the speed of the circulating water within the bowl, minimizing the tendency to prematurely jettison all of the bowl's water early during the cleaning phase.

The user may also adjust the flow of the stream using a flow control valve 252. For instance, the user may set the default of the flow control valve to approximately 75% open. In this regard, the user can make adjustments by further opening the valve, e.g., beyond the 75% open position for a stronger flow, or further closing the valve for a softer impact on the bowl's surface.

Still further, the nozzle 248 may pivot relative to the upper portion 242 of the mast 240 so that the angle and/or orientation of the stream 264 may be adjusted. Moreover, the stream 264 may be controlled by adjusting the angle of the flexible upper portion 242 of the mast 240 if the upper portion 242 is flexible. In this manner, the tendency to prematurely jettison all of the bowl's water during the cleaning phase may be minimized by adjusting the angle of the curvature of the upper portion 242 of the mast 240.

Also, the stream may be adjusted by physically relocating the water discharge device 230 closer to or further from the bowl 262, or the stream may be manipulated by adjusting the overall height of the nozzle 248 e.g., when using a telescoping mast 240.

In an illustrative implementation, the user may first begin setup by adjusting the concentration of the stream 264 using the stream adjuster 250. The more concentrated the stream 264 is, the faster the water will swirl and the more force will be applied to scour the surface of the bowl 262 and discharge debris and contaminated water. However, there is a point when the stream 264 may become too concentrated and most of the stream 264 will be discharged and water may not swirl properly or may not persist for a sufficient period of time to clean the bowl 262. The user should moderate the force of discharge to achieve a desired performance of the kit 200. Factors used in determining the desired strength of the stream 264 include, but are not limited to, the depth of the bowl 262, the diameter of the bowl 262, the shape of the bowl 262, the configuration of the barrier 202, etc.

If desired results are not achieved, the user may adjust the flow control valve 252 to strengthen or weaken the flow of the stream 264. Moreover, if the desired results cannot be met by the first two adjustments (adjuster 250 and/or the flow control valve 252), then other adjustments may be necessary, such as to raise, lower or adjust the angle of the nozzle 248, to adjust the location of the water discharge device 230 relative to the bowl 262, etc., as set out in greater detail above.

As described more fully herein, the circular/swirling cleaning and scouring action of the cleaning phase is typically forceful, and is maintained for a duration to sufficiently clean the bowl 262. As such, the bowl 262 will invariably contain less than an adequate depth of clean water, if not be substantially empty at the end of the cleaning cycle. Accordingly, a bowl filling phase is performed.

According to aspects of the present invention, in addition to cleaning the bowl 262, the kit 200 may be utilized to fill or refill the bowl with new water. During a filling phase, the water discharge device 230 sprays water at a second pressure, e.g., a low pressure, in a stream 264 pointed toward the bowl 262 of the birdbath 260 so as to cause the bowl to refill with water.

FIGS. 2A and 2B further illustrate the use of a dual zone timer 270 to set the time of operation for both the cleaning phase and the filling phase. The dual zone timer 270 includes an input 272, a full-pressure output 274 and a low pressure output 276. A pressure reducer 277 is provided to reduce the pressure of water exiting the low-pressure output 276. The pressure reducer 277 is schematically illustrated as part of the dual zone timer 270. However, in practice, the pressure reducer 277 may be internal or external to the dual zone timer 270 as described in greater detail herein. The timer 270 may also comprise one or more flow control components 278, and timer control circuitry 280.

The input 272 of the dual zone timer is hooked up to a water source via any suitable conduit 282. The water source may comprise, for example, a bibcock mounted to an external wall of a house that is coupled to the input 272 using a garden hose. The input 272 feeds both the full-pressure output 274 and the low-pressure output 276. To create full-pressure water for the water discharge device 230, e.g., during a cleaning operation, the water is directed from the input 272 to the full-pressure output 274, e.g., without any significant pressure change. However, to create low-pressure water for the water discharge device 230, e.g., during a filling operation, the water from the input 272 is run through the low-pressure output 276. As mentioned above, the pressure reducer 277 may be implemented internal to the timer 270, e.g., in a flow path of the low-pressure output 276. However, in practice, the pressure reducer 277 may alternatively be external to the timer 270. For instance, the pressure reducer 277 may be implemented as an in-line pressure reducer, e.g., inserted between the low pressure output 276 and a corresponding connection to common connector 210. In this regard, the pressure reducer 277 may be a pressure reducing washer, an inline device, or other structure that reduces the pressure of the water to a pressure suitable for performing the filling operation.

In an exemplary implementation, the dual zone timer 270 further includes flow control components 278 that function logically like a switch that is operable in at least three positions. In a first logical state, i.e. "off position," the dual zone timer 270 prevents water provided to the input 272 from reaching both the full-pressure output 274 and the low-pressure output 276. In this state, no water reaches the common connector 210. In a second state, i.e. "cleaning position," the timer 270 prevents water at the input 272 from reaching the low-pressure output 276; however, water is allowed to pass to the full-pressure output 274. In a third state, i.e. "filling position," the timer 270 prevents water at the input 272 from reaching the full-pressure output 274; however, water is allowed to flow through the low-pressure output 276 and through the pressure reducer 277.

The dual zone timer 270 also includes timer circuitry 280. The timer circuitry 280 allows programming that determines when water is to be coupled to the water discharge device 230, as will be described in greater detail herein. The timer 280 may be battery-operated, operated from alternating current from the power grid, mechanically operated, or a combination thereof.

The full-pressure output 274 and the low-pressure output 276 are hooked up to the first and second inputs of the common connector 210. Alternatively, the dual zone timer 270 may be integrated with the common connector 210. The output of the common connector 210 delivers the water (either full-pressure or low-pressure) to the water discharge device 230. The common connector 210 and water discharge device 230 may be hooked together directly or through a channel 284, e.g., a hose or a pipe. In this regard, the water discharge device 230 is able to receive water at either a full pressure, or a low pressure, using a single channel 284. If hooked together though a channel 284, then the channel 284 may be run underground to be out of the way. If this is the case, then the channel 284 may be connected to the water discharge device 230 via an elbow connector, e.g., a forty-five degree elbow connector (not shown) or any other suitable coupling arrangements.

With continued reference to FIGS. 2A and 2B, an example is provided to illustrate certain aspects of the present invention. The example is for illustration purposes only and should not be considered limiting.

A user wishes to automatically clean an existing birdbath 260 with a circular bowl 262. In the initial setup, the user chooses a barrier 202 that has a diameter that is one-third the diameter of the birdbath bowl 262 and a height that is at least equal to the depth of the bowl 262 at a vertical axis through the center of mass of water in the bowl 262. The user thus attaches the barrier 202 to the bowl 262. In the instance of a circular bowl, the user attaches the barrier 202 to the center of the bowl 262. The user then mounts a water discharge device 230 to the ground, e.g., at a distance of approximately nineteen inches from the nearest edge of the birdbath bowl 262 at an angle such that the stream 264 from the water discharge device 230 hits the birdbath bowl 262. For instance, the water may enter the bowl 262 at approximately the nine o'clock position between the edge of the bowl 262 and the edge of the barrier 202. The stream 264 may be positioned, for example, to substantially miss the barrier 202 but direct water into the bowl 262 adjacent to the barrier 202, as described in greater detail above.

By way of illustration, and not by way of limitation, an exemplary implementation of the mast 240 may comprise a lower portion 242 that is twenty-seven-and-a-half inches (approximately 70 cm) in height and an upper portion 244 that is twenty-one-and-a-half inches (54.6 cm) in height. The angle of the bend along the upper portion 244 may be approximately sixty-five degrees with respect to the vertical of the mast 140. For example, the upper portion 244 of the mast may be bent to have a one hundred-and-fifteen degree arc with a five inch (approximately 12.7 cm) radius imposed there upon. However, in practice, other lengths and/or angles may be implemented.

The user then hooks up the water discharge device 230 to the common connector 210, e.g., via a channel 284 that may be optionally buried underground, or otherwise routed between the common connector 210 and the water discharge device 230. The first input of the common connector 210 is hooked up to a full-pressure output 274 of a dual zone timer 270, and the second input of the common connector 210 is hooked up to a low-pressure output 276 of the dual zone timer 270. The input 272 of the dual zone timer is hooked up to the water source (e.g., the bibcock or faucet on the user's house). The user adjusts the timer circuitry 280 to control the duration and start time of a cleaning operation. The user may also adjust the timer circuitry 280 to control the duration and start time of a filling operation. In this regard, the capability and flexibility of the timer will control the minimum and maximum duration times and also the interval between maintenance operations.

For instance, in an illustrative example, a user may set up the timer circuitry 280 to implement three maintenance operations per day, e.g., at 10:00 a.m., 2:00 p.m., and 6:00 p.m. Each maintenance operation may comprise a pre-determined cleaning time of one minute followed by a pre-determined filling time of one minute. In practice, each maintenance operation need not comprise a cleaning operation followed by a filling operation. Rather, it may be desirable to repeat one or more of the maintenance operations during a given cycle. Still further, the cleaning operation and the filling operation may each execute for distinct durations.

The timer 270 normally prevents the water source from reaching the common connector 210. When the timer circuitry detects a programmed maintenance interval, the timer 270 controls operation to provide water to the water discharge device 230 according to the programmed cycle. For instance, keeping with the above example, assume that the timer circuitry 280 determines the time is 10:00 a.m., a programmed maintenance cycle time. In response thereto, the timer 270 may initially implement a cleaning operation. The cleaning operation requires a full-pressure water supply. As such, the timer 270 directs water from the water source to flow through the full-pressure output 274, through the common connector 210, through the channel 284, to the water discharge device 230, to form a stream 264.

The combination of swirling water around the barrier 202 and the discharge of water from the bowl 262 perform a cleaning operation that cleans and scours the surface of the bowl 262 as described more fully herein. For instance, the centrifugal force of the swirling water 262 may move contaminated water and debris to the discharge line of the stream 264. When the debris and contaminated water reach the discharge line of the stream 264, the stream 264 discharges the debris and contaminated water from the bowl 262 while continuing to swirl the water in the bowl 262. This cleaning phase lasts a predetermined time, e.g., one minute. However, the cleaning operation may be programmed to last any desired duration within the capability of the selected timer 270.

During the cleaning phase, substantially all of the water in the bowl 262 may be discharged. Also, competing water uses may coincide with the cleaning cycle during set up or during day to day operation so that a perfectly balanced setting which effectively cleans the bowl may not always leave the bowl with a full level of water at the conclusion of the cleaning cycle. As such, after the cleaning phase, the timer 270 controls operation to implement a filling phase. Water from the water source is prevented from reaching the full-pressure output 274, while the water is directed through the low-pressure output 276. The water flows through the common connector 210, through the channel 284, to the water discharge device 230, to form a stream 264. However, the use of the pressure reducer 277, e.g., within the timer 270 or in-line with a hose or connecter coupling (e.g., via a pressure reducing washer), reduces the water pressure to the extent that the water fills the bowl 262. In the illustrative example, the filling phase may last, for example, one minute. However, the filling operation may be programmed to last any desired duration within the capability of the selected timer 270.

After the filling phase, the timer 270 switches off the flow of water to the water discharge device 230 until the next programmed cycle, e.g., 2:00 p.m. in the above working example.

In such a way, the birdbath maintenance kit 200 can be used to automatically scour the surface of the bowl 262 and remove debris and contaminated water from an existing birdbath 260 after initial setup. The user no longer needs to manually clean the birdbath 260. A scheduled and fail-safe replacement of the contaminated water with fresh water may eliminate the growth of bacteria and the build-up of scum and algae, as well as keep birds healthier.

Figure 3A:
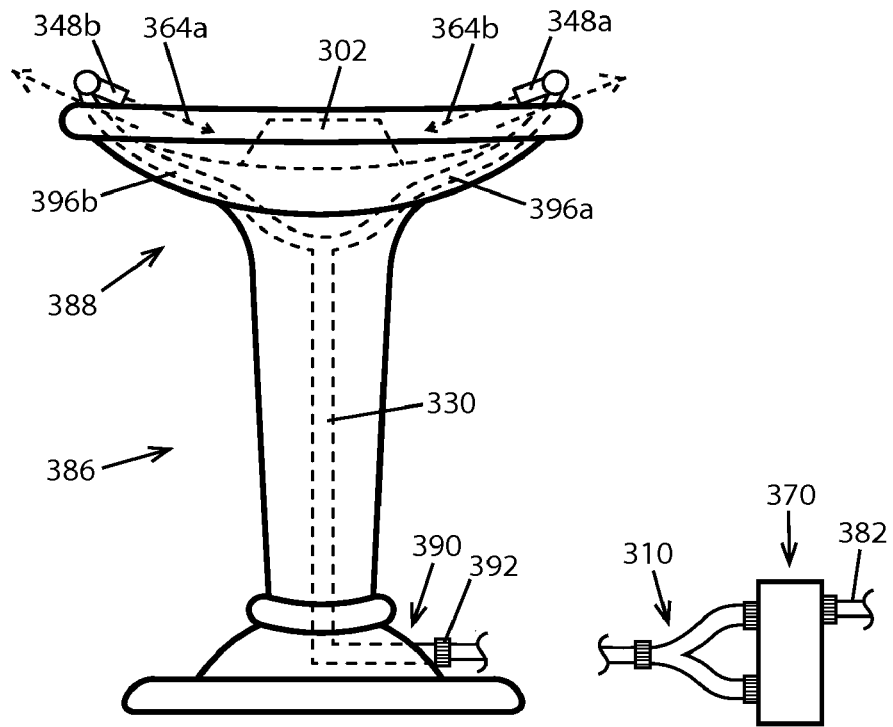
FIG. 3A is a schematic view of an embodiment of a birdbath with integrated birdbath maintenance components that operate periodically to provide for the automatic cleaning of the bowl and for the restoration of clean water to a bowl of the birdbath, according to various aspects of the invention.
Figure 3B:
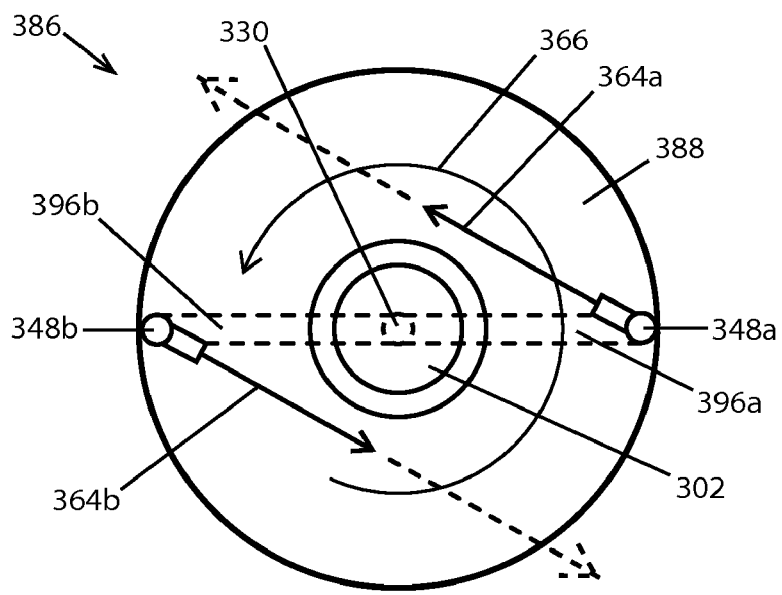
FIG. 3B is a top view of the birdbath of the embodiment of FIG. 3A, according to various aspects of the invention.

FIGS. 3A and 3B illustrate a birdbath with an integrated birdbath 386 maintenance system according to various aspects of the invention. FIG. 3A is a side view of a birdbath, while FIG. 3B is a top view of the bowl of the birdbath. Both figures are used in conjunction to illustrate the integrated birdbath 386 and include the same reference numerals referring to the same elements.

The integrated birdbath 386 includes a bowl 388 and a base 390. The base 390 includes an input 392 to receive water to a water discharge device 330. The input 392 includes a flow control valve. The base 390 may be hollow and the water discharge device 330 may be a hose or pipe. Alternatively, the base 390 may be solid except a space made specifically for the water discharge device 330. The water discharge device 330 couples to at least one channel and at least one corresponding nozzle. For instance, as illustrated, the water discharge device 330 splits off into two channels 396a, 396b which feed two nozzles 348a, 348b respectively. The nozzles are mounted on an outer edge (i.e. circumference) of the bowl 388. As depicted in FIGS. 3A and 3B, the nozzles 348a, 348b are located outside of the hollow space of the bowl 388, e.g., above the rim of the bowl 388. However, the nozzles 348a, 348b may be located within the hollow space of the bowl 388.

Further, the bowl 388 includes a barrier 302, e.g., located substantially at the center of the bowl 388, as illustrated. The positioning of the barrier 302 within the bowl 388 is described in greater detail with reference to FIGS. 2A and 2B. During a cleaning phase, full-pressure water is supplied to the input 392 and flows to the nozzles 348a, 348b through the water discharge device 330 and channels 396a, 396b, respectively. The nozzles 348a, 348b create streams 364a, 364b respectively, angled into the bowl 388 such that the streams 364a, 364b hit the bowl 388 substantially alongside the barrier 302. The streams 364a, 364b simultaneously discharge debris and contaminated water and swirl the water; the resulting swirling water 366 is centered on the barrier 302. The strength of the streams 364a, 364b may be adjusted by the flow control valve on the input 392, in a manner analogous to that described more fully herein.

In FIGS. 3A and 3B, the water swirls in the counterclockwise direction, however, the direction of the swirling water may be clockwise. The centrifugal force of the swirling water 366 moves debris and contaminated water around the bowl 388 in a rigorous rotation, which is maintained for a predetermined cleaning time. Water swirls around the bowl 388 and the debris and contaminated water are discharged from the bowl 388 when they cross in line with the water stream 364a, 364b in FIG. 3B. The cleaning phase lasts for a pre-determined amount of time.

During a filling phase, low-pressure water is supplied to the input 392 and flows to the nozzles 348a, 348b through the water discharge device 330 and channels 396a, 396b, respectively. The low-pressure streams 364a, 364b should not create any substantial discharge and water should remain in the bowl 388, although depending upon the setup, some water may eventually overflow from the bowl 388.

Alternatively, the integrated birdbath 386 may have only one nozzle 348a and one channel 396a feeding the nozzle 348a. In this regard, operation of the cleaning and filling phases are analogous to that set out in greater detail herein.

The input 392 to the integrated birdbath 386 may receive water from a dual zone timer 370 and common connector 310 similar in form and function to those described in reference to FIGS. 2A and 2B. Alternatively, the dual zone timer 370 and common connector 310 may be integrated into the base 390 or the bowl 388 of the integrated birdbath 386, so the input 392 is connected directly to a water source (e.g., a bibcock or faucet on a house).

According to various aspects of the present invention, a male end of a garden hose may be attached to a female hose connection of a swivel hose barb adapter, which protrudes from the center of the underside of the birdbath bowl, having been integrated during manufacture. While the bowl is being placed on the pedestal, the free female end of the hose is inserted through the opening in the top of the hollow pedestal base and is brought out through the opening in the base of the pedestal. A flow control valve may be attached to the female connector of the hose at the outer edge of the pedestal base. The garden hose or other conduit originating at the house is then attached to the female end of the flow control valve.

The swivel hose barb adapter may be attached, for example, to a length of tubing, e.g., using a clamp. The upper end of the tubing may be attached to a hose barb adapter using a second hose clamp, for example. In an illustrative implementation, the top of the hose barb adapter is positioned so as to protrude above the top of the birdbath basin outer rim. A temporary plug may be inserted into the free female end prior to the casting the masonry bowl in order to preserve the integrity of the water supply assembly during the casting process. The male plug is removed after the casting has cured whereupon a compression elbow is attached to the hose barb adapter. The discharge end of a length of tubing, e.g., flexible copper tubing, may be swaged so as to form an end piece. The unswaged end of the flexible copper tubing is then inserted into the compression fitting and the compression nut is tightened.

The water discharge tube, e.g., copper tube, at the top of the bowl's rim may be readily adjustable, allowing the user to aim the water stream across the bowl surface. The water stream is aimed so as to direct the water across the basin and downward toward the bottom of the basin, e.g., at the nine o'clock or three o'clock position as described more fully herein. Moreover, the stream may be directed immediately adjacent to the outer edge of the barrier 302, e.g., where the water is the deepest. The flow control valve at the pedestal base permits the water force to be decreased as needed in order to avoid an overly quick emptying of the basin during the cleaning cycle.

Figure 4:
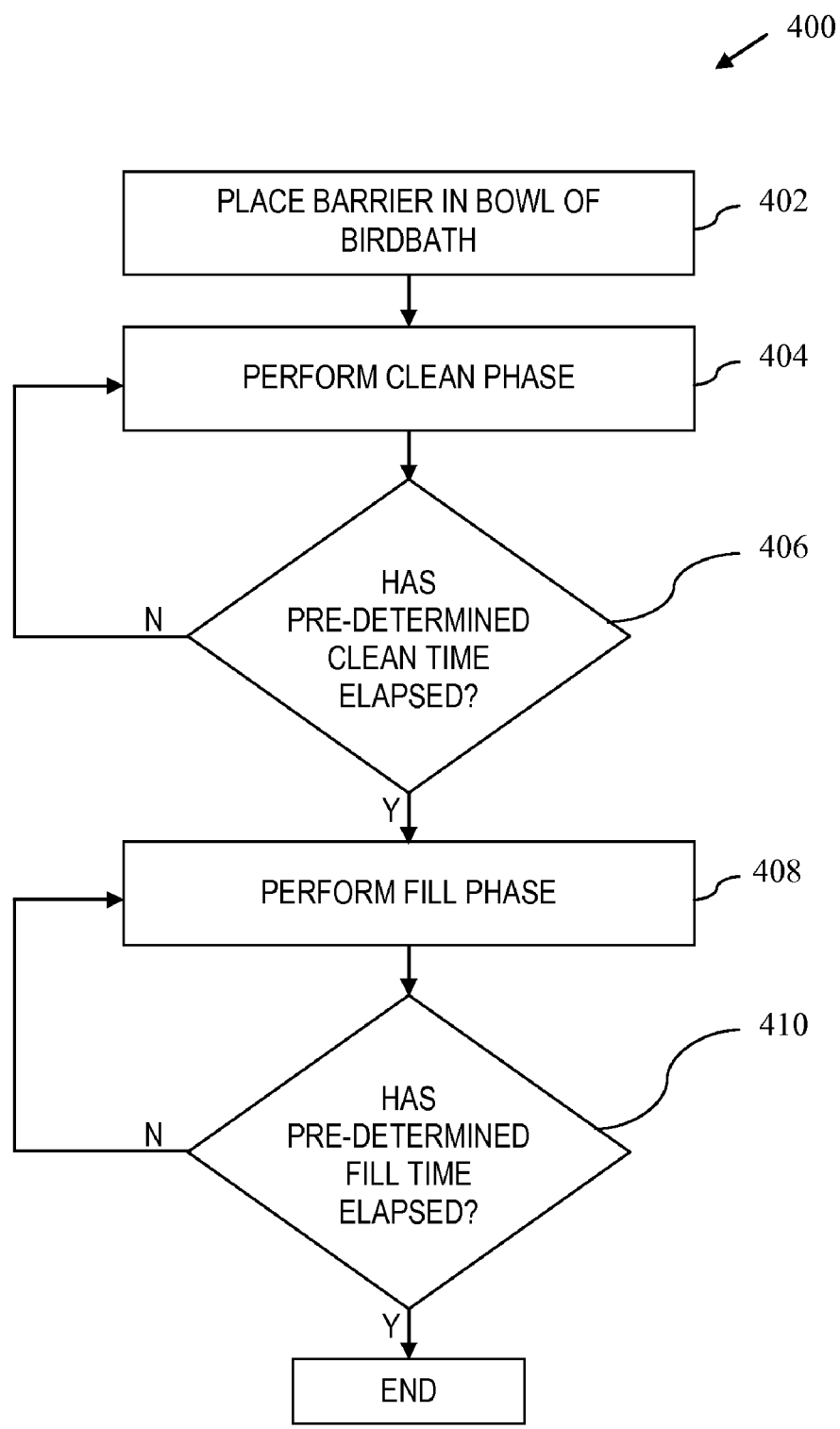
FIG. 4 is a flow chart illustrating a birdbath maintenance method, according to various aspects of the invention.

FIG. 4 is a flow chart illustrating a birdbath maintenance method 400, according to various aspects of the invention. At 402, a barrier is placed in a bowl of a birdbath. The barrier may be chosen based on the diameter of the birdbath bowl in which the barrier is placed. Further, the barrier may be chosen on a ratio of 1:3 of the diameter of the barrier to the diameter of the birdbath. The barrier may be removably placed in the birdbath bowl or permanently attached to the birdbath bowl.

The automated process starts. At 404, a cleaning phase is performed. The cleaning phase streams water through a water discharge device from a full-pressure water source such that water is sprayed from a nozzle positioned remotely from the barrier, into the bowl of the birdbath. The stream has sufficient force to simultaneously swirl the water around the barrier to clean the surface of the bowl and discharge debris and contaminated water from the birdbath bowl. The cleaning phase lasts for a pre-determined amount of time.

At 406, a determination is made as to whether the pre-determined amount of clean time has elapsed. If the pre-determined amount of clean time has not elapsed, the method 400 remains in the cleaning phase. If the pre-determined amount of clean time has elapsed, then the method 400 proceeds to 408.

At 408, a filling phase is performed. The filling phase streams water through the water discharge device from a low-pressure water source such that water is sprayed from the nozzle to fill the birdbath bowl with water. The filling phase lasts for a pre-determined fill time.

At 410, a determination is made as to whether the pre-determined amount of fill time has elapsed. If the pre-determined amount of fill time has not elapsed, the method 400 remains in the filling phase. If the pre-determined amount of fill time has elapsed, then the method 400 ends.

According to various aspects of the present invention, systems are provided for the automatic maintenance of birdbaths, which provide for the automatic restoration of clean water within birdbath bowls. Use of such devices avoids the need for daily human efforts to flush and fill an associated birdbath bowl. Use of the birdbath device also eliminates the need for difficult cleanups, which may require the use of harsh chemicals where a birdbath has not been cleaned for an extended period of time.

Various aspects of the present invention provide for the maintenance of birdbath bowls through the timely removal of contaminated water at appropriate intervals, e.g., two or more times per day during the active daylight hours, so that algae, bacteria and stain-producing agents are not permitted sufficient time to develop, and achieve an attachment to the masonry surface of the bowl. For instance, a timer may be utilized to perform maintenance towards the end of the day so that contaminated water is not allowed to remain in the bowl overnight.

According to further aspects of the present invention, the centrifugal force of the swirling water, e.g., when sustained over at least a substantial part of a corresponding cleaning phase, e.g., over the course of a one minute cleaning cycle, provides an effective scouring of the bowl surface as well as a near complete removal of the contaminated water while using standard domestic water pressures. A subsequent filling phase refills the bowl with clean water. The reliable repetition of cleaning and refilling should avoid the need to mechanically augment the applied water pressure beyond that which is available with typical domestic water supplies.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A birdbath comprising:
 a base including an input to receive water and a conduit operatively coupled to the input to receive water through the input;
 a bowl including a circumference, the bowl coupled to the base;
 a barrier attached to a surface of the bowl so as to be centered within a mass of water to be held by the bowl; and
 a first nozzle mounted on the circumference of the bowl and operatively coupled to the conduit to receive water and provide a first stream;
 wherein:
  the first nozzle is operative during a cleaning phase to stream water at a first pressure such that water is sprayed into the bowl of the birdbath with sufficient force to cause water to swirl around the barrier, wherein the swirling water cleans the bowl and debris and contaminated water in the bowl are discharged when such debris and contaminated water cross in line with the water stream from the first nozzle, the cleaning phase operating for a pre-determined cleaning time, and
  the first nozzle is operative during a filling phase to stream water at a second pressure, which is lower than the first pressure, such that water is sprayed from the nozzle to fill the birdbath bowl with water for a pre-determined fill time.

2. The birdbath of claim 1 further comprising:
 a dual zone timer comprising:
  a connector to receive water;
  a first output; and
  a second output;
  wherein the timer operates:
   in a first state to prevent water from the connector from reaching both the first output and the second output;
   in a second state to prevent water from the connector from reaching the second output while allowing water to flow from the connector to the first output; and
   in a third state to prevent water from the connector from reaching the first output while allowing water to flow from the connector to the second output; and
  timer circuitry programmable to be in the second state for an amount of time corresponding to the pre-determined cleaning time and in the third state for an amount of time corresponding to the pre-determined fill time;
 a pressure reducer; and
 a common connector having a first input, a second input and a common output, wherein, when the kit is further assembled,
  the first input of the common connector is coupled to the first output of the timer to provide water at the first pressure;
  the second input of the common connector is coupled to the second output of the timer such that the pressure reducer is there between, to provide the second pressure; and
  the common output is coupled to the water discharge device.

3. The birdbath of claim 2, wherein the timer circuitry is further programmable to cycle the timer through the three states multiple times per day during daylight hours.

4. The birdbath of claim 1, further comprising a second nozzle mounted on the circumference of the bowl generally opposite from the first nozzle and operatively coupled to the conduit to receive water and create a second stream,
 wherein:

the second nozzle is operative during the cleaning phase, to stream water in cooperation with water sprayed from the first nozzle, to cause water to swirl around the barrier, wherein the swirling water cleans the bowl and debris and contaminated water in the bowl are further discharged when such debris and contaminated water cross in line with the water stream from the second nozzle; and the second nozzle is operative to stream water in the filling phase, such that water is sprayed from the second nozzle to fill the birdbath bowl.

5. The birdbath of claim 1, wherein the first nozzle is able to be manipulated by the user to adjust the direction of the stream.

6. The birdbath of claim 1, wherein the first nozzle is located outside of a hollow space of the bowl, and above a rim of the bowl.

7. The birdbath of claim 1, wherein the first nozzle is positioned and oriented such that a stream from the first nozzle during a cleaning phase, hits the bowl alongside the barrier.

8. The birdbath of claim 1, further comprising a dual zone timer that couples to the base by a hose, wherein the timer is programmable to operate in the cleaning phase such that the swirling water scours the bowl of the birdbath for at least forty-five seconds.

9. The birdbath of claim 1, wherein a diameter of the barrier is approximately one-third a diameter of the bowl of the birdbath.

10. The birdbath of claim 1, wherein the first nozzle is stationary during the cleaning phase.

11. The birdbath of claim 1, wherein
the first nozzle further includes a flow control valve, and
the stream is adjustable by the flow control valve.

12. The birdbath of claim 1, further comprising a swivel hose barb adapter that extends underneath the bowl.

13. The birdbath of claim 1, further comprising:
a flow control valve attached to the input of the base.

14. The birdbath of claim 1, wherein the first nozzle attaches to the bowl so as to be repositionable by a user.

* * * * *